(12) United States Patent
Likus

(10) Patent No.: US 12,544,880 B2
(45) Date of Patent: Feb. 10, 2026

(54) VACUUM-COMPATIBLE CLAMPING AND/OR BRAKING DEVICE

(71) Applicant: HEMA Maschinen- und Apparateschutz GmbH, Seligenstadt (DE)

(72) Inventor: Edmund Likus, Seligenstadt (DE)

(73) Assignee: HEMA Maschinen- und Apparateschutz GmbH, Seligenstadt (DE)

( * ) Notice: Subject to any disclaimer, the term of this patent is extended or adjusted under 35 U.S.C. 154(b) by 0 days.

(21) Appl. No.: 18/993,360

(22) PCT Filed: Apr. 22, 2024

(86) PCT No.: PCT/EP2024/060855
§ 371 (c)(1),
(2) Date: Jan. 10, 2025

(87) PCT Pub. No.: WO2024/251423
PCT Pub. Date: Dec. 12, 2024

(65) Prior Publication Data
US 2025/0262723 A1     Aug. 21, 2025

(30) Foreign Application Priority Data
Jun. 5, 2023 (EP) .................................. 23177204

(51) Int. Cl.
B25B 11/00 (2006.01)
(52) U.S. Cl.
CPC .................. B25B 11/005 (2013.01)
(58) Field of Classification Search
CPC ........ B23Q 1/28; B23Q 1/287; B23Q 1/0072; B23Q 1/0063; B25B 11/005; B25B 5/065;
(Continued)

(56) References Cited

U.S. PATENT DOCUMENTS 3,753,478 A * 8/1973 Shiber ................. F16D 25/0635
92/24
5,111,913 A * 5/1992 Granbom ................. B23Q 1/28
188/170
(Continued)

FOREIGN PATENT DOCUMENTS

AT      E342149 T1    11/2006
AT      E376132 T1    11/2007
(Continued)

OTHER PUBLICATIONS

International Search Report and Written Opinion for International Application No. PCT/EP2024/060855, mailed Jul. 22, 2024.

Primary Examiner — Robert A. Siconolfi
Assistant Examiner — San M Aung
(74) Attorney, Agent, or Firm — Wolf, Greenfield & Sacks, P.C.

(57) ABSTRACT

The disclosure relates to an annular elastic element for a clamping and/or braking device, the element comprising: an annular spring plate, wherein the annular spring plate has a first annular side surface and a second annular side surface; a sealing element, wherein the sealing element is arranged on the second side surface of the spring plate, and wherein the sealing element forms an inner projection in a region of an inner edge of the annular spring plate and forms an outer projection in a region of an outer edge of the annular spring plate; wherein the inner and/or outer projection of the sealing element each forms a bulge at least in sections. The disclosure further relates to a housing part for a pneumatic clamping and/or braking device and to a pneumatic clamping and/or braking device having such an annular elastic element.

12 Claims, 8 Drawing Sheets

(58) Field of Classification Search
CPC .... F16D 49/00; F16D 63/008; F16D 2125/68; F16D 2121/02; B23B 31/107; B23B 31/305; B23B 2270/027
USPC .............................................. 188/67, 151 R
See application file for complete search history.

(56) References Cited

U.S. PATENT DOCUMENTS

| | | | |
|---|---|---|---|
| 5,836,233 A | 11/1998 | Rumsey | |
| 7,861,830 B2 | 1/2011 | Hofmann | |
| 2006/0042892 A1* | 3/2006 | Hofmann | B23Q 1/28 188/151 R |
| 2007/0090610 A1 | 4/2007 | Hoffmann | |
| 2008/0217872 A1* | 9/2008 | Hofmann | B23B 31/107 279/152 |
| 2025/0052292 A1 | 2/2025 | Zimmer et al. | |
| 2025/0108465 A1 | 4/2025 | Likus | |
| 2025/0108486 A1 | 4/2025 | Likus | |

FOREIGN PATENT DOCUMENTS

| | | | | |
|---|---|---|---|---|
| AU | 2003287866 A1 | 8/2004 | | |
| CN | 1842663 A | 10/2006 | | |
| CN | 101228005 A | 7/2008 | | |
| CN | 102678786 A | 9/2012 | | |
| CN | 203412996 U | 1/2014 | | |
| CN | 107127360 A | 9/2017 | | |
| CN | 111322341 B | 5/2021 | | |
| CN | 115325086 B | 5/2025 | | |
| DE | 10203008 A1 * | 8/2003 | ............ | F15B 15/103 |
| DE | 10335795 A1 | 3/2005 | | |
| DE | 102005033468 A1 | 1/2007 | | |
| DE | 102021006219 B3 | 12/2022 | | |
| EP | 1629939 A1 | 3/2006 | | |
| EP | 1585616 B1 | 10/2006 | | |
| EP | 1651881 B1 | 10/2007 | | |
| EP | 1910029 A1 | 4/2008 | | |
| EP | 2233768 A2 * | 9/2010 | ............ | B23Q 1/287 |
| ES | 2274289 T3 | 5/2007 | | |
| ES | 2295903 T3 | 4/2008 | | |
| FR | 2958986 A1 * | 10/2011 | ........... | F16D 65/186 |
| JP | 2006-513049 A | 4/2006 | | |
| JP | 2007-501361 A | 1/2007 | | |
| JP | 2009-501644 A | 1/2009 | | |
| JP | 4602256 B2 | 12/2010 | | |
| JP | 4607110 B2 | 1/2011 | | |
| JP | 4987867 B2 | 7/2012 | | |
| KR | 20060024334 A | 3/2006 | | |
| PL | 1651881 T3 | 3/2008 | | |
| WO | WO 01/34990 A1 | 5/2001 | | |
| WO | WO 2004/067222 A1 | 8/2004 | | |
| WO | WO 2005/015047 A1 | 2/2005 | | |
| WO | WO 2006/021120 A1 | 3/2006 | | |
| WO | WO 2007/009439 A1 | 1/2007 | | |
| WO | WO 2023/109993 A1 | 6/2023 | | |

* cited by examiner

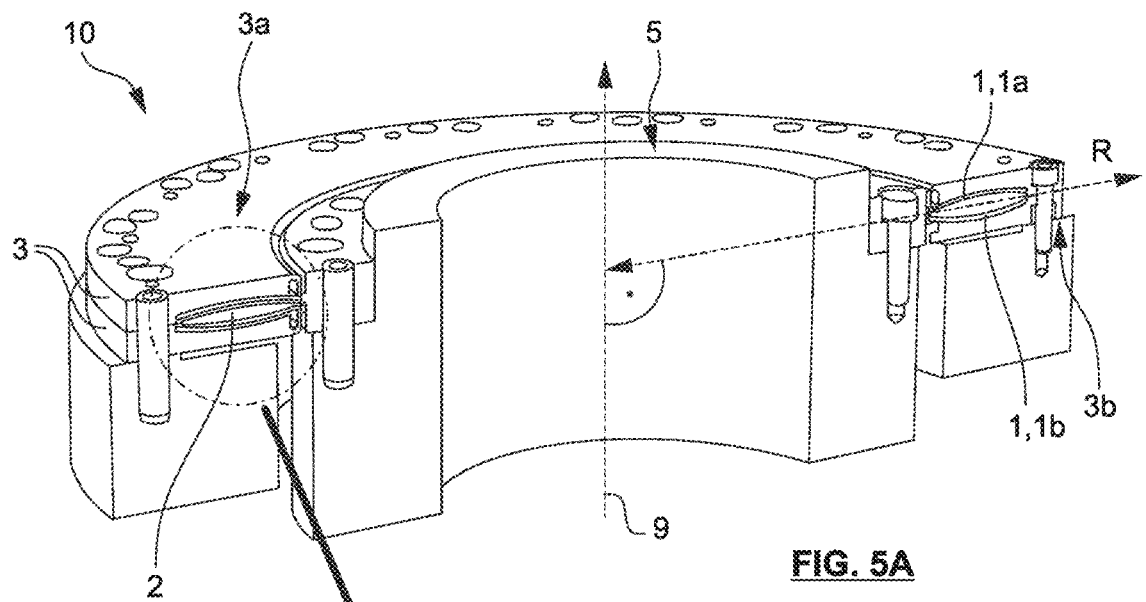
FIG. 5A
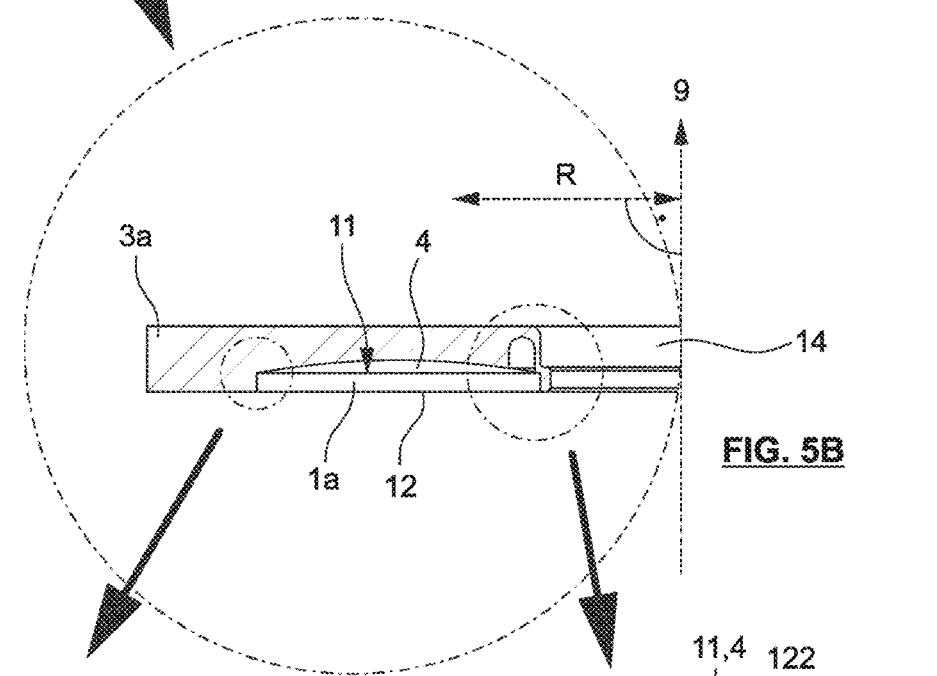
FIG. 5B
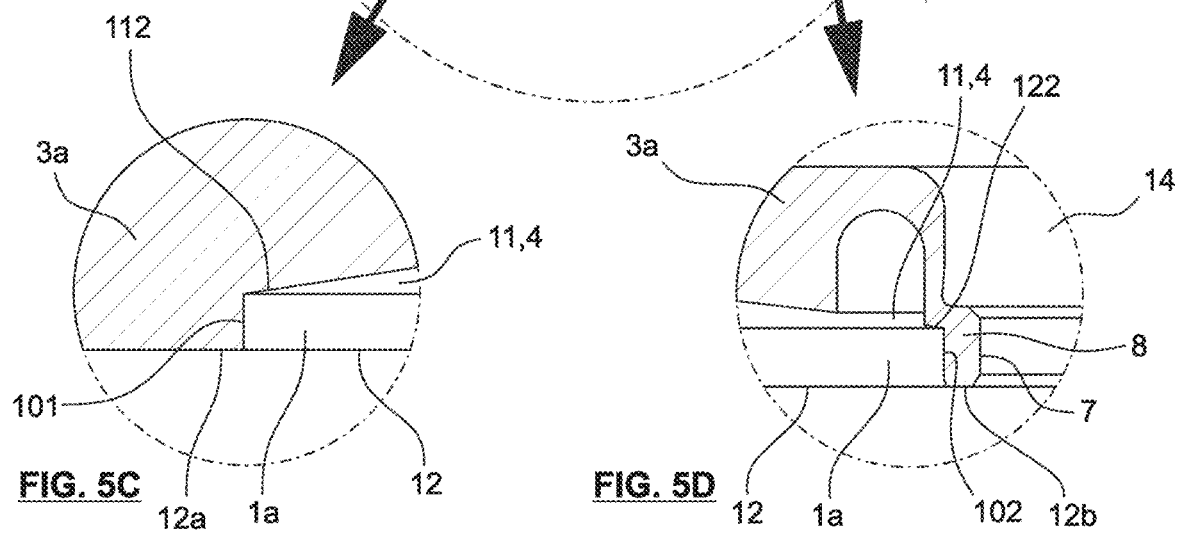
FIG. 5C
FIG. 5D

VACUUM-COMPATIBLE CLAMPING AND/OR BRAKING DEVICE

CROSS-REFERENCE TO RELATED APPLICATIONS

This application is a national stage filing under 35 U.S.C. § 371 of International Application No. PCT/EP2024/060855, filed Apr. 22, 2024, which claims the benefit of European Application No. 23177204.7, filed Jun. 5, 2023. The contents of these applications are incorporated herein by reference in their entirety.

TECHNICAL FIELD

The disclosure relates to an annular elastic element and a housing part for a pneumatic clamping and/or braking device and a pneumatic clamping and/or braking device having such an annular elastic element.

BACKGROUND

In the production of tool or machine parts, processing machines, in particular work spindles or other machine tools, are used which process material from a workpiece by means of tools fastened to a shaft, in particular in order to bring it into the desired shape. The shaft can be an axis of rotation or pivot axis of such a machine. Furthermore, rotatable or pivotable tables are used by means of a shaft to place tools or workpieces in the suitable processing position or to move workpieces at corresponding speeds. A prerequisite for precise and efficient processing is, inter alia, a high speed of the shaft. Emergency or safety systems therefore have the task of stopping the shaft in the event of malfunction or failure of the systems, such as power failure or cable breakage, or of holding it in a fixed position and thus fixing it.

Common processing machines have electromagnetic, hydraulic or pneumatic clamping and/or braking devices. Such devices have a friction lining which can be frictionally connected to the shaft by means of force transmission. Fixing the shaft at different speeds is thereby made possible.

In hydraulic clamping devices, a chamber is charged with hydraulic oil and clamps the rotating shaft or disc. Passive hydraulic clamps are also known. However, such hydraulic clamps have long reaction times or short reaction times require a very high outlay there. Furthermore, the hydraulic material, in particular hydraulic valves and hydraulic pipes, is costly and requires longer assembly times. An additional outlay for maintaining the cleanliness in the environment of a hydraulic clamp is also to be recorded by the hydraulic oil.

In pneumatic clamping and/or braking devices, elastic elements, in particular resilient plates, are usually charged with compressed air and can overcome some of the mentioned disadvantages of hydraulic clamping devices.

EP 1 585 616 B1 and EP 1 651 881 B1 describe pneumatic clamping devices with two annular spring plates which are introduced into a housing of the clamping devices and there form a pressure space which can be charged with compressed air or aerated and deaerated in order to change the bending of the spring plates and thereby change between a closed state of the clamping devices, in which an object to be clamped is clamped like a rotatable shaft, and an open state of the clamping devices, in which the object is free. In practice, however, it has been shown that such clamps cannot be operated in the vacuum and in the clean room without interference for the clamp and the environment.

BRIEF DESCRIPTION

Proceeding from the state of the art mentioned at the beginning, the disclosure is based on the object of providing means which enable a pneumatic clamping and/or braking device to be reliably operated in the vacuum or in the clean room.

The object is solved with an annular elastic element having the features of claim 1, with a housing part having the features of claim 8 and with a clamping and/or braking device having the features of claim 10. Preferred embodiments are described in the dependent claims, in the description and in the figures.

According to the solution according to the invention, an annular elastic element for a clamping and/or braking device is provided, the element comprising: an annular spring plate, wherein the annular spring plate has a first annular side surface and a second annular side surface; a sealing element (here also referred to as "second sealing element" since it is arranged on the second side surface of the spring plate), wherein the sealing element is arranged on the second side surface of the spring plate, and wherein the sealing element forms an inner projection in a region of an inner edge of the annular spring plate and forms an outer projection in a region of an outer edge of the annular spring plate, the inner and/or outer projection of the sealing element respectively forms a bulge at least in sections.

The term "annular" in this disclosure is not necessarily to be understood as a circularly annular. Other annular embodiments, such as angular annular embodiments, are also covered by this term.

According to the term "projection", the inner and outer projections rise or stick out from one or more surfaces of the (second) sealing element. Preferably, the (second) sealing element is formed integrally and/or in one piece with the inner and/or outer projection.

According to the solution according to the invention, a housing part for a clamping and/or braking device is furthermore provided, the housing part comprising:

an annular recess for clamping the elastic element according to the invention, wherein the recess forms a first annular edge and a second annular edge of an annular opening of the housing part, wherein the annular recess defines an inner surface of the housing part between the first annular edge and the second annular edge, wherein the inner surface forms a first slope in the region of the first annular edge and the inner surface forms a second slope in the region of the second annular edge, wherein the slopes are oriented such that the annular opening increases towards the first and second edges. The bulge and the slopes have the effect that the elastic element according to the invention and the housing part according to the invention form products related to each other since each bulge can come into contact with one of the slopes.

According to the solution according to the invention, a clamping and/or braking device for clamping and/or braking an object to be clamped and/or braked is further provided, the device comprising: a first elastic element according to the invention and a second elastic element according to the invention; a housing comprising a first housing part, preferably according to the invention, with an inner surface and a second housing part, preferably according to the invention, with an inner surface, wherein the housing parts are arranged relative to each other and fastened to each other such that the inner surfaces of the housing parts together delimit an inner space within the housing; one or more clamping elements, wherein each clamping element has a clamping surface; a spring arranged in the inner space comprising the first elastic element and the second elastic element, wherein the elastic elements are arranged within the inner space such that a first pressure space is formed in the inner space between the elastic elements and the inner surfaces of the housing parts, wherein the first pressure space can be deaerated and can be subjected to positive pressure of a pressure medium that can be supplied to the housing, wherein the first elastic element is clamped in the inner space with its first side surface facing the inner surface of the first housing part, and wherein the second elastic element is clamped in the inner space with its first side surface facing the inner surface of the second housing part; wherein the spring is designed such that, when the first pressure space is aerated or the first pressure space is subjected to positive pressure, a bending of at least one of the spring plates of the elastic elements can be changed and thereby the device changes between an open state, in which an object to be clamped is spaced apart from the one or more clamping surfaces, and a closed state, in which at least one of the one or more clamping surfaces transmits a clamping and/or braking force to the object, wherein the bulge of the inner or outer projection of at least one of the elastic elements is designed to establish contact with a first section of the inner surface of one of the housing parts in order thereby to at least inhibit a flow connection between the first pressure space and the transition between the housing parts.

The problem, not overcome for a long time, of the interference-prone operation of the clamping and/or braking devices in the vacuum or in the clean room (clamp falls out and/or ambient atmosphere is loaded by the clamp) could be overcome by aspects of this invention. The following developments of the inventors have made contributions to this in each case individually and increasingly in combination.

For example, the inner and/or outer projection of the (second) sealing element can respectively form a preferably radially extending bulge (or bulge or outwardly directed curvature) at least in sections in order to achieve a particularly good seal at the transition of the housing parts for use in the vacuum or in a clean room. The bulge can be produced by the application of additional (elastic) material of the sealing element with respect to the rest of the projection. These bulges can fill an inner space within a housing part for example in the region of a gap at the transition of the housing parts and can be brought into sealing contact against an inner wall (e.g. a slope or long chamfer) of the housing part. Preferably, the bulge of the outer projection of the second sealing element extends radially outwards, preferably radially outwards over the outer edge of the spring plate. Preferably, the bulge of the inner projection of the second sealing element extends radially inwards, preferably radially inwards over the inner edge of the spring plate.

For the seal of the first pressure space against a gap at the transition of adjacent housing parts, the bulges are particularly advantageous. The bulges have the effect that during operation of the first pressure space hardly any or no medium flows in or out via the housing edge.

As an alternative or in addition to the bulges, the inner projection and/or outer projection of the second sealing element preferably respectively has an at least in sections planar surface, which can serve as a particularly sealing bearing surface for example with respect to a housing wall or another elastic element. As a result, the clamp or the second pressure space thereof is increasingly sealed in order to inhibit or prevent an escape of the pressure medium from the second pressure space into the environment. The planar surfaces increase the resistance to the permeability of a pressure medium (in particular gases) when applying the pressure medium to the second pressure space. The planar surfaces reduce or prevent the overflow of a medium between the first pressure space and the second pressure space. Preferably, the bulge is respectively neighboring or adjacent to the planar surface. Preferably, the planar surface respectively merges into the bulge.

The planar surfaces additionally support the displacement of the bulges against the inner wall of the housing parts and thus the above-described effects of the bulges. This support is particularly pronounced when, as described, the planar surface is neighboring or adjacent to the associated bulge and/or merges into it. The planar surfaces and the respectively associated bulges thus form a combination of features which interact synergistically, but can be present individually.

With regard to use in a vacuum or clean room, the elastic material used for the elastic element can be a suitable material which preferably has little or no release of material into the vacuum (high media resistance), is suitable for high temperatures and/or has a low gas permeability.

In order to make a further contribution to a particularly good seal for use in a vacuum environment or in a clean room, the elastic element according to the invention can have a first port seal for a first port for applying a pressure medium to the first pressure chamber, wherein the first port seal seals the first port. Preferably, an edge of the first port seal can at least partially and preferably completely surround a first port opening and can be present in the form of an O-ring.

In order to make a further contribution to a particularly good seal for use in a vacuum environment or in a clean room, the elastic element according to the invention can have a second port seal for a second port for applying a pressure medium to the second pressure chamber, wherein the second port seal seals the second port. Preferably, an edge of the second port seal can at least partially and preferably completely surround a second port opening and can be present in the form of an O-ring. Particularly preferably, the edge can form a port projection of the second port seal, which at least in sections forms an undercut at the edge of the second port opening. The housing part can be undercut by the undercut of the port projection of the elastic element. The undercut of the second port seal increases the sealing towards the outside and reduces the risk of the second port seal lifting off from the planar housing surface, especially when applying the first pressure space. In addition, the use of sealing compound (adhesive) at this point can be avoided by the undercut. Such a sealing compound could have a negative effect on the vacuum or clean room.

In order to make a further contribution to a particularly good seal for use in a vacuum environment or in a clean room, the housing part of a housing part according to the invention or a device according to the invention can have a, preferably circular, groove or nut for receiving an O-ring. The groove or nut with O-ring supports the above-described function of the bulge and the first port seal to the effect that during operation of the first pressure space no fluids flow in or out via the housing edge. In addition, the sealing compound (adhesive) between the housing halves, which is undesirable for use in the vacuum and in the clean room, can be dispensed with.

In order to make possible the use of the clamp in a moist environment in addition to use in the vacuum or in the clean room, the inventors have developed a series of means which are described below and can also be combined in each case individually and in combination with the means described above.

During operation of the device under the influence of liquid media, in particular in the region of the clamping surface, there is the possibility of penetration of the liquid medium into the housing of the device. As a consequence of this possibility, the penetration of the medium into the first pressure space is shown during operation, which leads to a build-up in the first pressure space. The penetration of the liquid medium leads to failure of the components on account of leaks (for example rubber damage), soiling in the device and worsening of the reaction times of the device. The inventors have recognised that the penetration of the liquid medium is to be attributed decisively to small gaps which are present at the transition of the housing parts, in particular of the two clamping elements or clamping surfaces of the housing parts, of the device. During the process of opening, for example, a second pressure space is expanded by, for example, the second pressure space being charged with compressed air. At the same time, the first pressure space is deaerated. The movement of the elastic element (for example rubberised spring plate) displaces the air out of the first pressure space and thus leads to a suction effect through the first pressure space. As a consequence of the penetration of the liquid medium into the first pressure space, a permanent small leak then generally arises, inter alia with respect to the second pressure space, which leads to a constant flow of the liquid medium as long as the second pressure space is expanded. As a result of this effect, the suction effect is intensified further and leads to accelerated failure or to premature malfunction in the device.

Against this background, the inventors have recognised that fitting a sealing element with a projection on that side of the elastic element which faces the first pressure space interrupts this suction effect or inhibits it to such an extent that these above-described failures or malfunctions for the device can no longer occur. In particular, the fluidic connection of the first pressure chamber to the transition of the housing parts or clamping elements can be inhibited by these means without the opening and closing function of the device or the dynamics thereof being impaired as a result. In the elastic element according to the invention, a second sealing element is arranged on the second side surface of the annular spring plate and the second sealing element has an inner projection in a region of an inner edge of the annular spring plate of the elastic element and an outer projection in the region of an outer edge of the annular spring plate. These two projections on the inner and outer edge of the spring plate usually serve for resting on an opposite second elastic element or an inner wall of a housing in order to form the second pressure space there. Each of these two projections can therefore preferably have a bearing surface. According to the above findings of the inventors, the elastic element according to the invention has, on the other (first) side surface of the spring plate, which can consequently face the first pressure space, a (first) sealing element which forms a first projection which is consequently suitable for projecting into the first pressure space and at least inhibiting the fluidic connection of the first pressure space to the transition of the housing parts there.

The first projection is preferably formed between the inner and outer edge of the annular spring plate, wherein particularly preferably the first projection is formed in a region of the inner or outer edge of the annular spring plate in order, depending on whether the clamping action is directed inwards or outwards, to be close to the above-described gaps between the clamping elements. The first projection is preferably fitted on the first side surface of the annular spring plate in such a way that it is suitable for being fitted in the region of the transition of the housing parts or of the clamping elements and for projecting into the first pressure space.

Accordingly, the first projection rises or sticks out from a surface of the first sealing element. Preferably, the first sealing element is integrally and/or in one-piece formed with the first projection.

According to a preferred aspect of the elastic element, the first sealing element further has-preferably on the first side surface preferably in a region of the edge of the annular spring plate which is opposite the edge on which the first projection is arranged-a second projection which serves as a further interruption or inhibition of the fluidic connection of the first pressure space to the transitions of the housing parts or clamping elements.

According to a preferred aspect of the elastic element, the first and/or the second sealing element are vulcanised on the spring plate and are thus particularly well fixed there.

Preferably, the first and/or the second projection respectively have an at least in sections rounded surface in order to produce a contact in an arbitrarily shaped recess of the housing which can bring about the above-described inhibition or interruption of the fluidic connection.

According to a preferred aspect of the housing part or of the device, the housing part has an indentation or depression in the inner surface of the housing part, wherein the indentation or depression is preferably complementary in shape to the surface of the first or second projection contacting it so that the above-described contact is particularly effective (sealing).

The inventors have recognised that both the first projection and the second, optional projection of the first sealing element are respectively also suitable for inhibiting or even preventing an escape of pressure medium (in particular gases) to which the first pressure space can be applied. As a result, in addition to use of the clamp in the vacuum or clean room, use in a moist environment is also better made possible.

For use in a moist environment or in the vacuum or clean room, a suitable material, preferably made of steel, can be used for the housing parts which is preferably not susceptible to corrosion in order to avoid the release of rust into the vacuum or clean room.

By means of the means described here individually and in combination, clamps can be provided which can be reliably operated in the vacuum and/or in the clean room, and optionally also in a moist environment, without the dynamics of the opening and closing of the clamp being negatively impaired as a result.

If this brief description describes features which are not listed in the claims, these features do not represent essential features in the sense that these features are necessarily to be included in the claims, but these features are particularly prominent preferred realizations of the claimed subject matter, can be combined with each of the claims and can also be combined with one another arbitrarily.

BRIEF DESCRIPTION OF THE FIGURES

FIG. 5A shows a cross section through an inventive pneumatic clamping and/or braking device in a three-dimensional representation.

FIGS. 5B to 5D show a variant of a housing part taken from FIG. 5A.

Figure 1A:
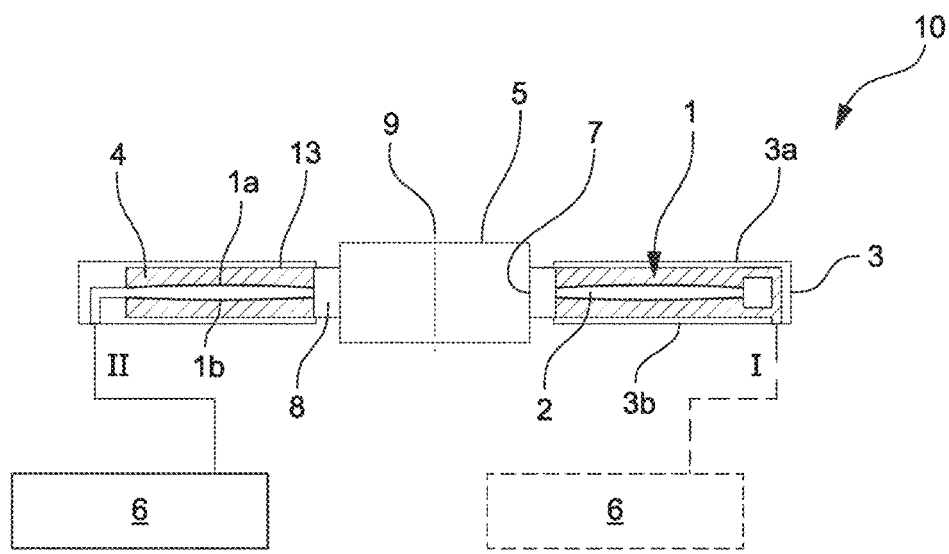
FIG. 1A shows a schematic cross section through an inwardly directed, passive pneumatic clamping and/or braking device according to the invention in the closed state.

Components which are illustrated in a plurality of figures bear the same reference signs.

DETAILED DESCRIPTION

The disclosure relates to an annular elastic element and a housing part for a pneumatic clamping and/or braking device and a pneumatic clamping and/or braking device having such an annular elastic element.

When reference is made in this document to the device "clamp" or "clamping device", the "clamping force" or the process of "clamping", the device of the "brake" or "braking device" or the "braking force" or the process of "braking" is likewise also comprised.

FIGS. 1A to 5A and 8 show schematic cross sections through such a clamping device 10 according to the invention having a housing 3 which comprises two housing parts 3a, 3b, and having a spring 1 which is arranged in the housing 3 and which comprises at least two annular elastic elements 1a, 1b according to the invention.

The clamping device 10 according to the invention comprises the following: a first elastic element 1a according to the invention and a second elastic element 1b according to the invention; a housing 3 comprising a first housing part 3a having an inner surface and a second housing part 3b having an inner surface, wherein the housing parts 3a, 3b are arranged with respect to one another and fastened to one another such that the inner surfaces of the housing parts 3a, 3b together delimit an inner space 13 within the housing 3; one or more clamping elements 8, wherein each clamping element 8 has a clamping surface 7; a spring 1 which is arranged in the inner space 13 and comprises the first elastic element 1a and the second elastic element 1b, wherein the elastic elements 1a, 1b are arranged within the inner space 13 such that a first pressure space 4 is formed in the inner space 13 between the elastic elements 1a, 1b and the inner surfaces of the housing parts 3a, 3b, wherein the first pressure space 4 can be deaerated and can be subjected to positive pressure of a pressure medium which can be fed to the housing 3, wherein the first elastic element 1a is clamped in the inner space 13 with its first side surface facing the inner surface of the first housing part 3a, and wherein the second elastic element 1b is clamped in the inner space 13 with its first side surface facing the inner surface of the second housing part 3b; wherein the spring 1 is designed such that when the first pressure space 4 is aerated or subjected to positive pressure of the first pressure space 4, a bending of at least one of the spring plates of the elastic elements 1a, 1b can be changed and thereby the device 10 changes between an open state, in which an object 5 is spaced apart from the one or more clamping surfaces 7, and a closed state, in which at least one of the one or more clamping surfaces 7 is transmitted a clamping and/or braking force to the object 5. The device 10 according to the invention further comprises the means mentioned at the beginning which allow reliable operation of the device in the vacuum and/or in the clean room. These means are explained in more detail in connection with FIGS. 6 to 12.

FIGS. 1A, 1B, 4A and 4B each show such clamping devices 10 in the closed state in that the clamping surface 7 of the clamping element 8 touches the circumference of the object 5. The clamping element 8 is also referred to as clamping lip. The clamping element 8 can be formed in one piece with the other parts of the housing part 3a, 3b or can be a component of the housing part 3a, 3b which is structurally separate from the other parts.

The clamping force or effect of the clamping surface 7 on the object 5 to be clamped takes place in a clamping plane which is spanned by two vectors which each form a radius of the annular elastic elements 1a, 1b or annular recess 11 (cf. FIG. 5A). The axis 9 can run through the centre point of the ring of the components described here as annular and can therefore be referred to as main axis of the clamping device 10 which can run perpendicular to the clamping plane. When reference is made in this document to "inner" and "outer" projection, edge or end, inner edge(s), projection or end are closer to the axis 9 than corresponding outer edge(s), projection or end. The same can also apply to other components.

Figure 1B:
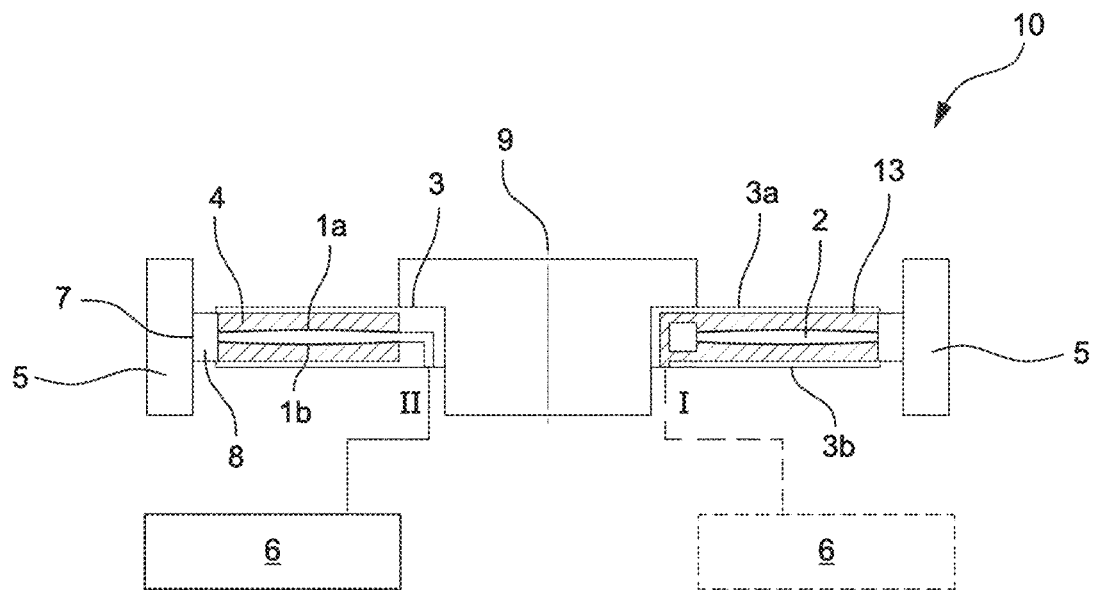
FIG. 1B shows a schematic cross section through an outwardly directed, passive pneumatic clamping and/or braking device according to the invention in the closed state.
Figure 4A:
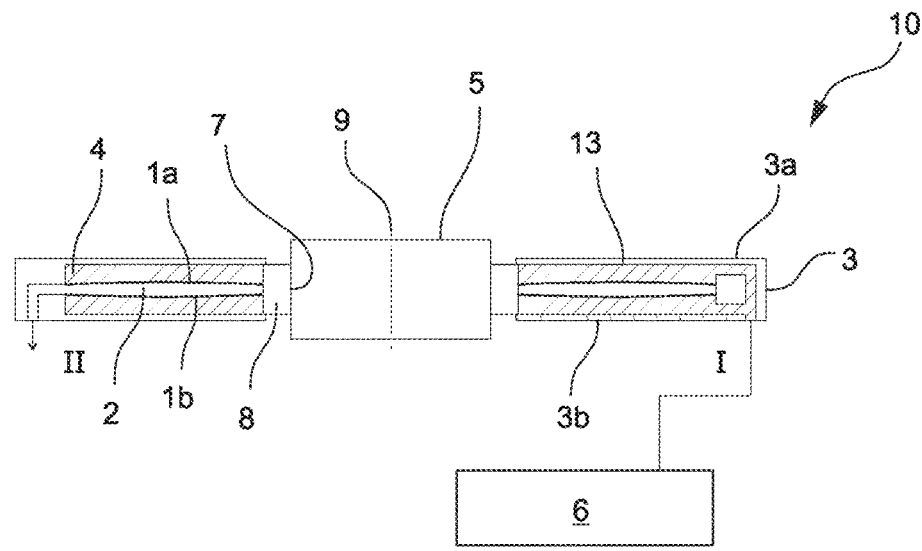
FIG. 4A shows a schematic cross section through an inwardly directed, active pneumatic clamping and/or braking device according to the invention in the closed state.
Figure 4B:
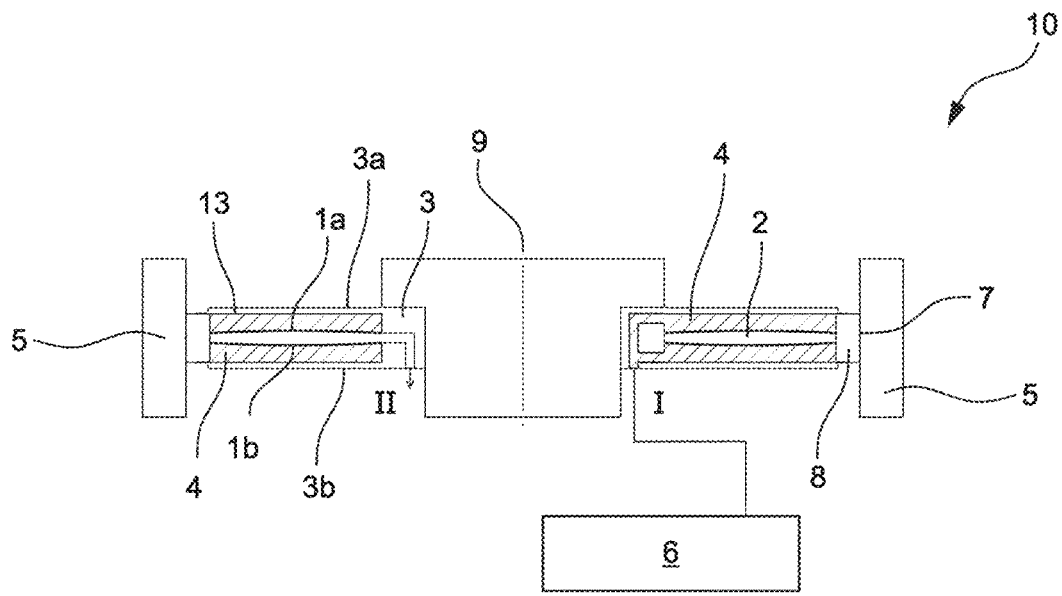
FIG. 4B shows a schematic cross section through an outwardly directed, active pneumatic clamping and/or braking device according to the invention in the closed state.

The clamping device 10 can be configured rotationally symmetrical about this main axis 9. The main axis 9 can run approximately or precisely centrally through an opening of the clamping device 10 (opening 14 in FIG. 5B). In FIGS. 1A, 4A, the object 5 to be clamped, for example a rotatable shaft of a machine or a table, is placed within the opening 14 and the clamping force of the clamping device is therefore directed within the clamping plane radially inwards towards the main axis 9 (perpendicular to the main axis 9). In FIGS. 1B, 4B, the object 5 to be clamped is placed outside the clamping device 10 and the clamping force of the clamping device is therefore directed within the clamping plane radially outwards away from the main axis 9 (perpendicular to the main axis 9).

In FIGS. 1A, 2A, 3A, 4A, the clamping element 8 is located between spring 1 and opening 14 or main axis 9. In FIGS. 1B, 2B, 3B, 4B, on the other hand, the object 5 to be clamped at least partially surrounds the clamping device 10, so that the clamping element 8 is located there between object 5 and opening 14 or main axis 9. In FIGS. 1B, 2B, 3B, 4B, a component which at least partially fills the opening 14 and through which the main axis 9 extends can be introduced into opening 14 instead of the object 5 to be clamped.

In FIGS. 1A to 5A, in each case the spring 1 is clamped between two contact surfaces (101 and 102 in FIGS. 5C and 5D) within the housing 3 of the clamping devices 10 and extends between the two contact surfaces. In the pressureless initial state of the device 10 in FIGS. 1A to 2B, the spring 1 can be slightly bent in order to be fixed firmly in the housing 3 in this state and the same can apply to any other state of the device 10, the degree of bending of the spring 1 depending on the state in which the device 10 is located. If the device 10 is in a state in which the spring 1 is bent (e.g. more strongly bent than in the pressureless initial state, such as in the open state), deaerating of an inner pressure space 2 of the spring 1 and aerating of an outer pressure space 4 can lead to the at least partial relaxation of the spring 1 while the spring 1 presses against the radial contact surfaces, the spacing of which increases somewhat, so that the housing 3 is thereby elastically deformed in the region of the clamping element 8 or the clamping surface 7 and the clamping surface 7 thereby touches the object 5 and is pressed against the object 5 with a (predefined) clamping force in order to clamp the object 5 firmly. The object 5 is clamped firmly and the clamping device 10 is in the closed state, as shown in FIGS. 1A and 1B. In the closed state of the device 10, the spring 1 can still be slightly bent even after the partial relaxation in order to be fixed firmly in the housing 3 in this state.

Here, the clamping element 8 can be an elastic element, such as a spring fork, which, in the pressureless initial state of the device 10, is brought by the spring force of the (slightly) bent spring 1 from an initial position, in which the elastic element is relaxed, into a tensioned position, for example by bending the spring fork 8, until an equilibrium between a restoring force of the elastic element 8 and the spring force of the spring 1 arises in the pressureless initial state. With this equilibrium, the clamping surface 7 can press against the object 5.

By additionally charging the outer pressure space 4 in the closed state with compressed air (for example at 4 bar or 6 bar), there is the optional possibility of increasing the clamping force by a predetermined value. This is indicated in FIGS. 1A, 1B by the optional additional compressed air pump (booster) 6 and the hatching (compressed air) in the outer pressure space 4. The outer pressure space 4 can be connected by means of an opening in the housing 3 to an air connection I (also referred to as "close"), to which the compressed air pump 6 can be connected.

Hereby, for example, an actuation of the device 10 is possible such that a change takes place between a braked movement (in the pressureless state) of the charged object 5 and a complete clamping of the object (in the case of a sufficient application of pressure).

Even if two pressure spaces 2, 4 are shown and described here by way of example, the clamping device 10 can also be operated with a single pressure space, which can be for example the inner pressure space 2 or the outer pressure space 4.

Figure 2A:
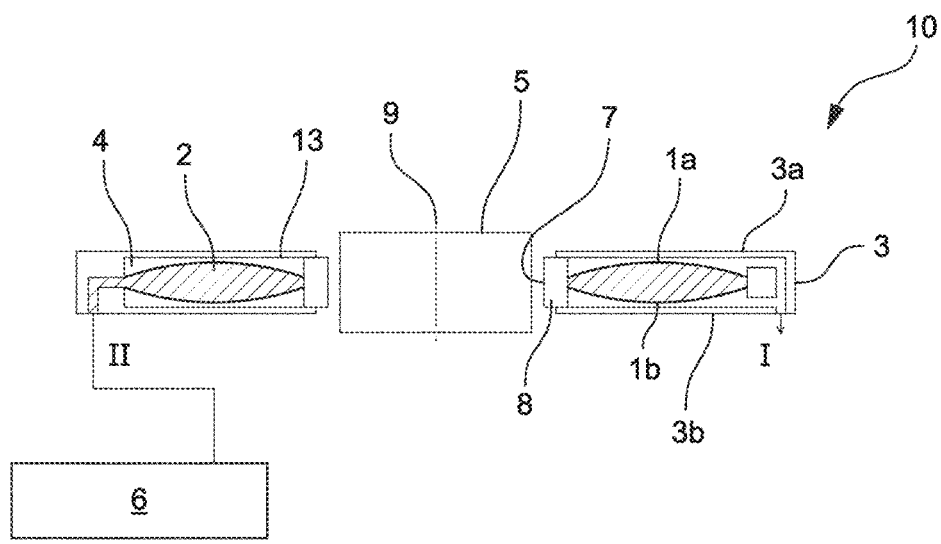
FIG. 2A shows a schematic cross section through an inwardly directed, passive pneumatic clamping and/or braking device according to the invention in the open state.
Figure 2B:
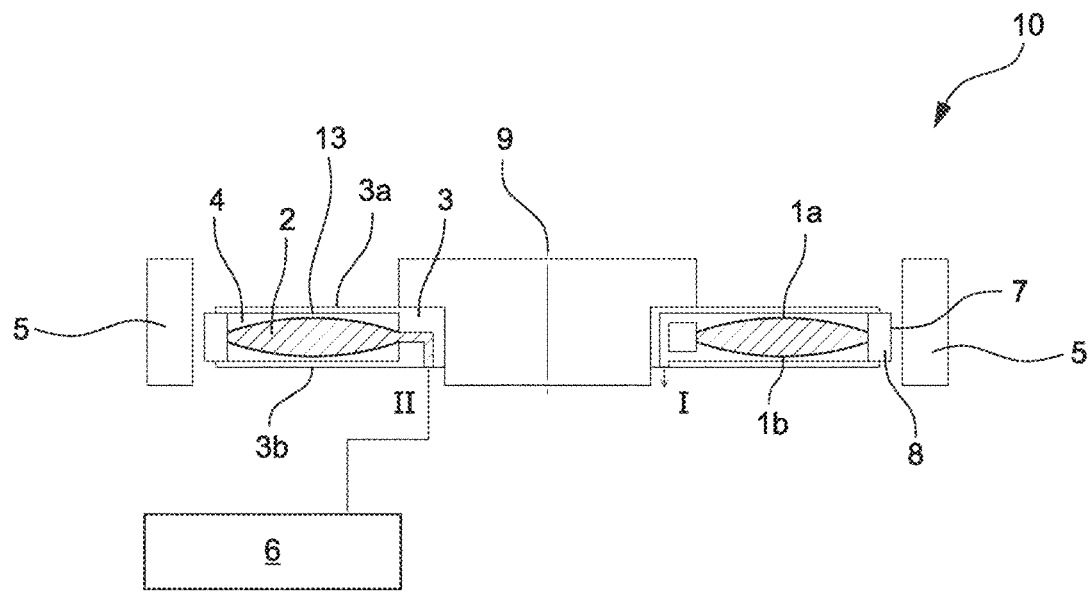
FIG. 2B shows a schematic cross section through an outwardly directed, passive pneumatic clamping and/or braking device according to the invention in the open state.
Figure 3A:
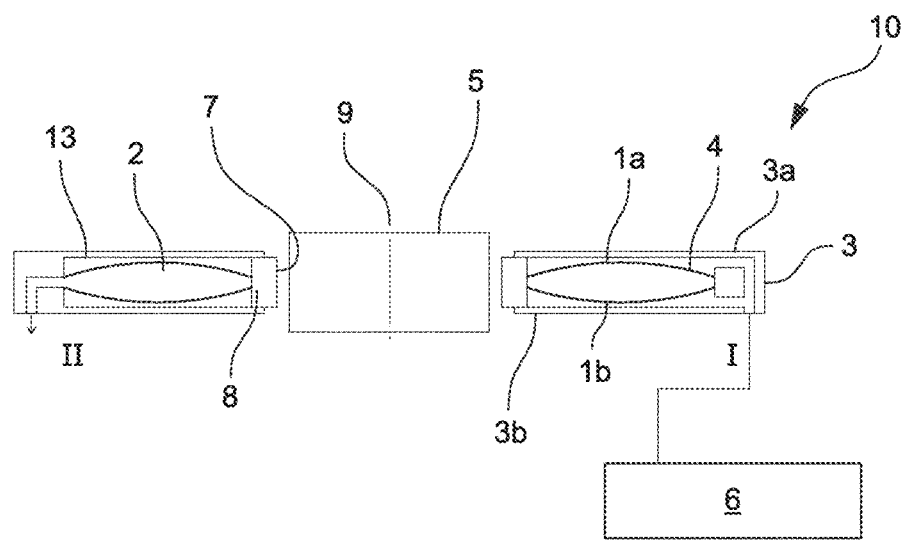
FIG. 3A shows a schematic cross section through an inwardly directed, active pneumatic clamping and/or braking device according to the invention in the open state.
Figure 3B:
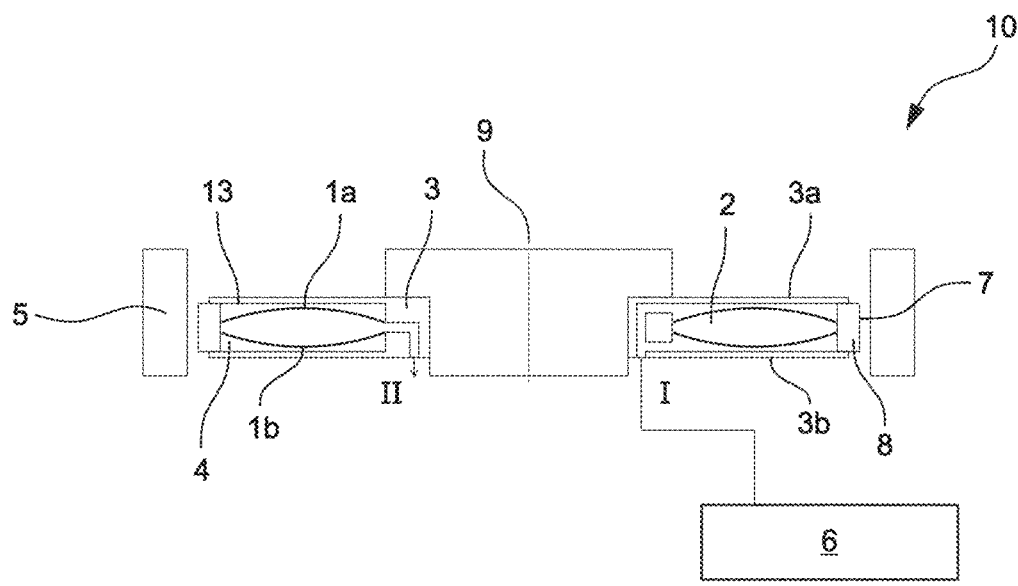
FIG. 3B shows a schematic cross section through an outwardly directed, active pneumatic clamping and/or braking device according to the invention in the open state.

FIGS. 2A and 2B show the clamping devices 10 from FIGS. 1A and 1B each in the open state in which the clamping surface 7 does not touch the circumference of the object 5 or is spaced apart from the circumference of the object 5. The inner pressure space 2 can be connected by means of an opening in the housing 3 to an air connection II (also referred to as "open"), to which a compressed air pump 6 can be connected.

By charging the inner pressure space 2 by the compressed air pump 6 with compressed air (for example 4 bar or 6 bar) and deaerating the outer pressure space 4, the spring 1, compared with the closed state from FIGS. 1A, 1B, is bent or tensioned more strongly (convexly) and a radial shortening of the spring 1 or of the distance between the two contact surfaces occurs. The clamping surface 7 lifts off from the object 5 in order to lift the clamping. The object 5 is freely movable (for example rotatable about axis 9 or linearly movable along axis 9) and the clamping device 10 is open.

It is possible to change back and forth between the closed state and the open state of the device 10.

Such pneumatic clamps 10 have a series of advantages over hydraulic clamps.

By using the combination of elastic component, in this case a spring 1 together with elastic elements 1a, 1b, and compressed air, for example very short reaction times are achieved during the changeover between the open and closed state and a secure clamping of the object 5 is likewise brought about. The spring 1 can preferably be configured plate-shaped, as shown in more detail in FIG. 5, wherein two elastic elements 1a, 1b resting on each other form the spring 1 and the inner pressure space 2 of the spring 1 between the plates 1a, 1b. The plates 1a, 1b can likewise be annular, as shown in FIG. 5, and can optionally additionally have radial slots, such that a change in the inner diameter is possible with particularly low forces. The elastic elements 1a, 1b can be coated with rubber, at least in the region of slots, in order to produce the seal required for the compressed air. The elastic elements 1a, 1b are generally configured so pressure-resistant and so elastically bendable and arranged in the housing 3 of the clamping device 10 such that the inner pressure space 2 is formed within the spring 1 between the elastic elements 1a, 1b and the outer pressure space 4 is formed between each elastic element 1a, 1b and the housing 3 or the housing parts 3a, 3b of the clamping device 10. FIG. 5 shows a three-dimensional view of a clamping device 10 similar to FIGS. 1A and 2A.

By aerating or charging with compressed air the outer pressure space 4 and deaerating the inner pressure space 2, as shown in FIG. 1A, the spring 1 is at least partially relaxed and brings about a clamping force on the object 5 to be clamped, in particular on the circumference of a shaft 5. In the event of energy or pressure failure, the object 5 is thereby clamped or the shaft 5 is immediately brought to a standstill and therefore offers a safety clamping. Depending on the size, such pneumatic clamps 10 can achieve holding moments of several 100 Nm and up to several 1000 Nm, which can be further increased by additionally charging the outer pressure space 4 with compressed air, as indicated in FIG. 1A by a pressure pump 6 (booster). In this case, a compressed air of a few bar (for example 4 bar or 6 bar) is sufficient for providing a multiple of the holding moments which are achieved without a booster. In this case, the fact is used that small transverse bending of the plates 1a, 1b (perpendicular to their longitudinal axis) during the changeover between the open and closed state of the clamp 10 generate large spring forces which can be used for clamping or for releasing prestressed clamping devices 10. Reliable clamping and releasing of rapidly rotating machine shafts 5 is thus also made possible.

In the case of pneumatic material, the costs and the assembly outlay are also lower in comparison with the hydraulic material and no additional outlay for producing cleanliness on the system arises by using compressed air. Such pneumatic clamps also allow a small overall size, since a small transverse bending and a small (change in the) longitudinal extent of the spring, and thereby small volumes of the pressure spaces, are sufficient to apply the required clamping forces.

In the case of pneumatic clamps, a distinction is made in principle between passive clamping devices 10, as shown in FIGS. 1A to 2B, and active clamping devices 10, as shown in FIGS. 3A to 4B.

In the pressureless initial state, the spring 1 can be bent to different extents (transversely) and can thus be shortened radially to different extents. The inner side of the housing 3 can be adapted to the bending of the elastic elements 1a, 1b or define the latter. A corresponding stop surface for the elastic elements 1a, 1b can be formed, for example, by a housing inner wall. The housing inner wall can be formed complementary (for example concavely) to a (for example convex) bending of the elastic elements 1a, 1b.

In the case of passive clamping devices 10, in the pressureless initial state the spring 1 is generally bent or prestressed slightly elastically (for example convexly) and the clamping devices 10 can be closed (FIGS. 1A, 1B). The clamping device 10 is opened only by the action of force from the inside via charging the inner pressure space 2 with compressed air (FIGS. 2A, 2B). In most cases, the spring 1 is bent somewhat in the pressureless initial state, with the result that, in the case of clamping or in the case of a pressure drop, the spring force provided by the energy stored in the spring 1 is transmitted to the object 5 to be clamped as a clamping force in order to clamp the object 5.

In the case of active clamping devices 10, in the pressureless initial state (FIGS. 3A, 3B) the spring 1 is bent more strongly, in particular more convexly, transversely outward than in the case of passive clamping devices, with the result that the distance between the two radial contact surfaces is shortened and the clamping device 10 is open. No clamping force is brought about on the object 5 via the clamping surface 7. The object is free since the clamping surface 7 does not touch the object 5 or is spaced apart from the object 5.

By plastic deformation of the elastic elements 1a, 1b, the spring 1 can be bent more strongly transversely outward in the same housing 3 in the pressureless initial state and can thus be shortened more strongly radially than in the case of passive clamping devices. This smaller radial extent of the elastic elements 1a, 1b in the pressureless initial state can lead to an open state of the clamping device 10 in the pressureless initial state. Even in the case of plastic deformation, the elastic elements 1a, 1b are elastically bent and press against the contact surfaces with the result that the spring is fixed in the housing. The inner space of the housing or the recesses can accommodate the curvature brought about more strongly by plastic deformation in the initial state.

The clamping force must now be actively induced from the outside, as shown in FIGS. 4A and 4B, in order to transfer the clamp into the closed state. Here, compressed air is introduced into the outer pressure space 4 by a compressed air pump 6 and the spring 1 is thus charged with compressed air from the outside in such a way that the spring 1 is actively relaxed, the curvature of the spring 1 is reduced, the distance between the two contact surfaces is increased, and the housing 3 is elastically deformed in the region of the clamping element 8 or the clamping surface 7, so that the clamping surface 7 touches the object 5 and brings about a clamping force on the object 5 and the object 5 is thereby clamped firmly. The active clamping device 10 is then in the closed state.

Depending on the field of application and prescribed safety regulations, use is therefore made of an active or passive clamping system 10. If primarily a safety clamping is desired, a passive clamping device is generally used. With such pneumatic passive clamping systems, it is possible to generate a predetermined clamping force already in the pressureless state during a corresponding mounting of the device in an overall device, with which clamping force the object 5 to be clamped is charged. By charging with positive pressure or negative pressure, the forces transmitted to this object can be increased, reduced or completely eliminated, which opens up a wide variety of applications. If, on the other hand, a deliberate work operation, such as a tool change, is to be carried out primarily with the clamping device, an active clamping device is generally used.

As illustrated in FIG. 5A, the housing 3 of the clamping devices 10 according to the invention comprises two housing parts 3a, 3b which are fixed to each other with fastening means, such as screws, and mounted such that in the mounted state the two housing parts 3a, 3b define the inner space 13 between the housing parts 3a, 3b within the housing 3 in which the spring 1 together with its annular elastic elements 1a, 1b according to the invention are arranged. The housing parts 3a, 3b respectively define a recess 11 which is likewise annular and which serves for receiving the annular elastic elements 1a, 1b, as illustrated in FIGS. 5A to 5D. At least a part of the first contact surface 101 of the housing part can run (substantially) perpendicular to the radial direction R of the annular recess 11 and/or a part of the second contact surface 102 of the housing part can run (substantially perpendicular) to the radial direction R of the annular recess 11.

An opening 14 (FIG. 5B) into which the object 5 to be clamped, such as a shaft, can be introduced extends through the center of the housing 3. The housing can extend up to 360° around this opening and at least partially encloses the object 5 in at least one plane which is referred to as clamping plane. The central main axis 9 of the clamping devices runs centrally through the opening 14 and perpendicular to the clamping plane. In clamping devices according to FIGS. 1A, 2A, 3A, 4A, 5A, the main axis 9 runs centrally through the shaft along its longitudinal axis.

Along the circumference of the housing 3 or the opening 14 there is located one or more of the clamping surfaces 7 which, in the case of elastic deformation of the housing 3 in the region of the clamping element 8 or the clamping surface 7, brings about the clamping force on the outer circumference of the object 5 and can thereby clamp the object 5. For effective opening and closing of the clamping device 10 with respect to the object 5 to be clamped, without the risk of damage to the object 5, a symmetrical distribution of the clamping force along the clamping surface 7 or along the circumference of the object 5 is desirable. A non-symmetrical distribution of the clamping force can lead to damage to the object 5. Preferably, one or both contact surfaces 101, 102 are configured circular within the clamping plane. Preferably, the clamping surface 7 is configured circular within the clamping plane. The clamping element 8 can be configured annular. All annular or circular components described here can have in each case individually or in combination as centre point the intersection point of the main axis 9 with the clamping plane (e.g. centre point of the opening 14).

Figure 7:
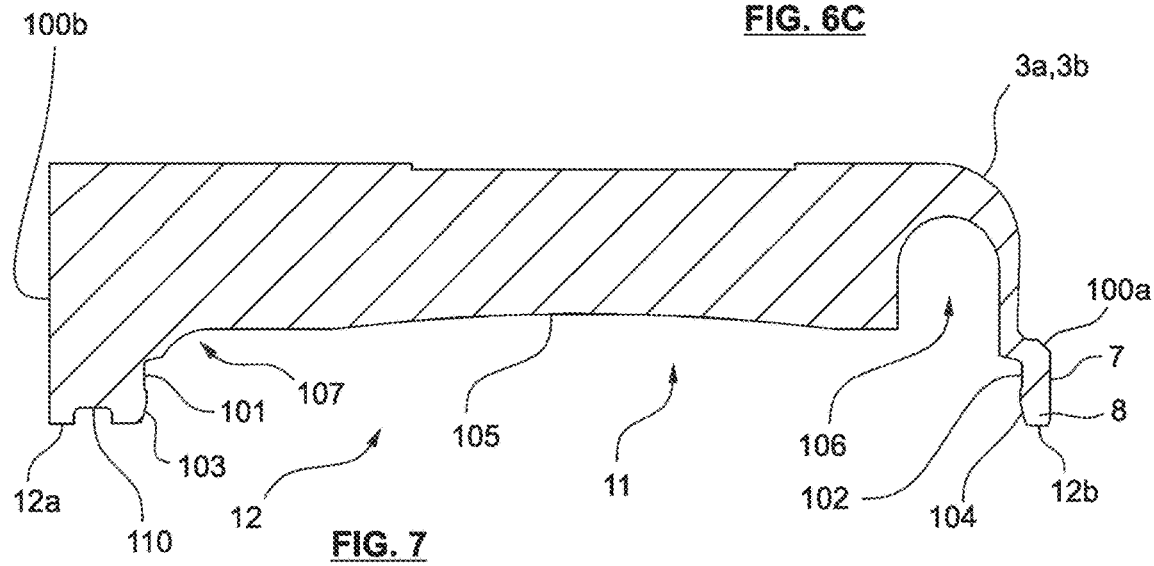
FIG. 7 shows a section through a variant of a housing part according to the invention.

FIG. 5B shows an embodiment of the housing part according to the invention (here the upper housing part 3a from FIG. 5A), wherein the housing part 3a has an annular recess 11 for clamping the annular elastic element 1a, and wherein the housing part 3a has an inner surface defined by the recess 11 (cf. 105 in FIG. 7). The annular recess 11 preferably defines an annular opening 12 in the housing part, wherein the annular opening is formed between a first annular edge 12a of the housing part and a second annular edge 12b of the housing part. The elastic element 1a is clampable between the first annular edge 12a and the second annular edge 12b.

When the elastic element 1a is introduced into the recess 11 with the first side surface (cf. 16c in FIG. 6C) facing the inner surface through the opening 12 and clamped in the recess 11, the first pressure chamber 4 is formed between the inner surface and the elastic element 1a. The elastic element according to the invention in this case has the means mentioned at the beginning which allow reliable use of the component in the vacuum and/or in the clean room. These means are explained in more detail in connection with FIGS. 6 to 12.

As shown in FIGS. 5C and 5D, the illustrated elastic element 1a of the spring 1 extends from a first contact surface 101 within the housing part 3a to a second contact surface 102 within the housing part 3a and can touch the latter. The first contact surface 101 in this case is arranged radially further outside than the second contact surface 102 as seen from the centre point of the opening 14.

FIG. 5C shows the section of the housing part 3a illustrated in FIG. 5B in which the upper plate 1a of the spring 1 meets the first contact surface 101 and is preferably in contact with the latter. FIG. 5D shows the section of the housing part 3a illustrated in FIG. 5B in which the upper plate 1a of the spring 1 meets the second contact surface 102 and is preferably in contact with the latter. However, it is also possible for in each case one or more further components via which the elastic element 1a exerts its spring force on the contact surfaces 101, 102 to be located radially between the elastic element 1a and one or more of the contact surfaces 101, 102.

As can be seen in FIGS. 5B, 5D, the elastic element 1a is clamped in the recess 11 between inner sides of the housing part 3a. Each of the plates of the spring 1 is introduced in the direction of the main axis 9 of the clamping devices 10 through the opening 12 into the recess 11 of the respectively associated housing part during the mounting along inner surfaces of the housing part 3a until the respective plate abuts against a stop 112, 122 at the end of each of the two contact surfaces 101, 102 and therefore cannot be introduced further into the recess 11. Since the extent of the elastic element 1a in the clamping plane or in the radial direction of the annular recess can be greater than the extent of the inner space defined by the housing part, the plate 1a can be bent or prestressed in the pressureless initial state.

Figure 6A:
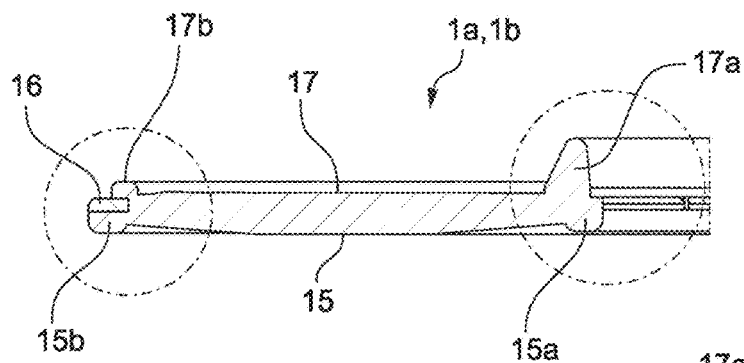
FIGS. 6A to 6C show an embodiment of the elastic element according to the invention.
Figure 6B:
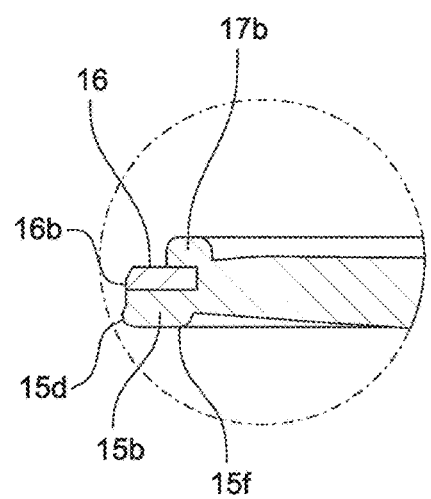
Figure 6C:
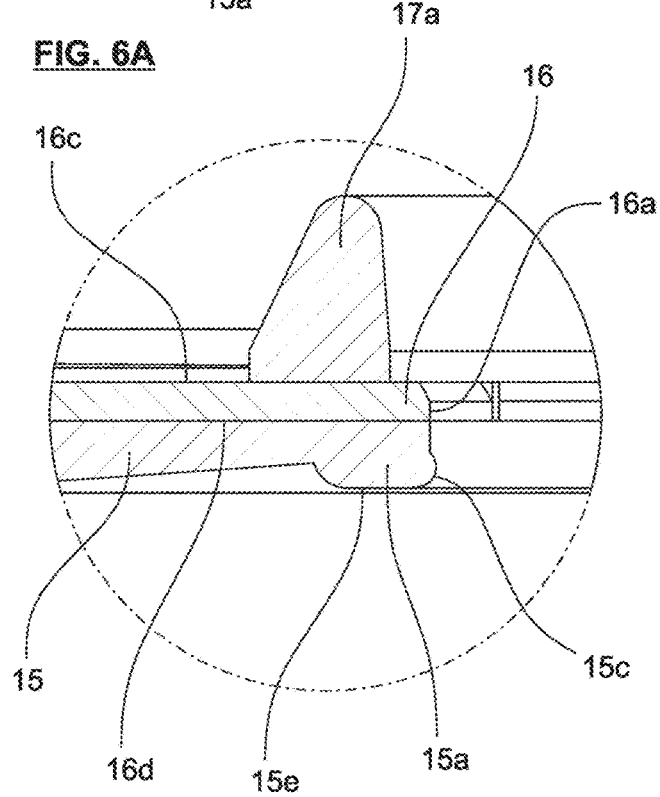

In the drawings of FIGS. 6A to 6C, embodiments of the means of the elastic element according to the invention for use in the vacuum and/or in the clean room, and the optional means for use in a moist environment are illustrated in more detail.

FIG. 6A shows an annular elastic element 1a, 1b according to the invention for a clamping and/or braking device 10, the element 1a, 1b comprising: an annular spring plate 16, wherein the annular spring plate 16 has a first annular side surface 16c and a second annular side surface 16d; an optional (first) sealing element 17, wherein the (first) sealing element 17 is preferably arranged on the first side surface 16c of the spring plate 16; a (second) sealing element 15, wherein the (second) sealing element 15 is arranged on the second side surface 16d of the spring plate 16, and wherein the (second) sealing element 15 forms an inner projection 15a in a region of an inner edge 16a of the annular spring plate 16 and forms an outer projection 15b in a region of an outer edge 16b of the annular spring plate 16, wherein the inner and/or outer projection 15a, 15b of the (second) sealing element 15 respectively forms a bulge 15c, 15d at least in sections. Preferably, the optional (first) sealing element 17 forms a first projection 17a.

FIGS. 6B and 6C show that the first projection 17a is formed between the inner 16a and outer edge 16b of the annular spring plate 16; here, by way of example, the first projection 17a is formed in a region of the inner 16a or outer 16b edge of the annular spring plate 16.

FIGS. 6A and 6B furthermore show that the first sealing element 17, preferably in a region of the outer edge 16b of the annular spring plate 16, forms an optional second projection 17b on the first side surface 16c.

Each of the projections 15a, 15b, 17a, 17b of the first and/or second sealing element 15, 17 can be annular at least in sections and extend annularly about the axis 9. Each of the projections 15a, 15b, 17a, 17b of the first and/or second sealing element 15, 17 can respectively be fixed, preferably vulcanised, to the spring plate 16 or arranged detachable from the spring plate 16, preferably as an O-ring.

FIGS. 6A and 6C additionally show that a longitudinal axis of the first projection 17a of the first sealing element 17 is (substantially) perpendicular to the first side surface 16c of the spring plate 16.

As shown in FIGS. 6B and 6C, the inner projection 15a and/or outer projection 15b of the second sealing element 15 respectively has an at least in sections planar surface 15e, 15f, which serves as a bearing surface for example with respect to an (inner) housing wall or another elastic element in order thus to delimit and seal the second pressure space 2. These figures additionally show that the inner and/or outer projection 15a, 15b of the second sealing element 15 respectively forms a radially extending bulge 15c, 15d at least in sections.

Preferably, the bulge 15d of the outer projection 15b of the second sealing element 15, as shown in FIG. 6B, extends radially outwards, preferably radially outwards over the outer edge 16a of the spring plate 16. Preferably, the bulge 15d is neighboring or adjacent to the planar surface 15f. Preferably, the planar surface 15f merges into the bulge 15d.

Preferably, the bulge 15c of the inner projection 15a of the second sealing element 15, as shown in FIG. 6C, extends radially inwards, preferably radially inwards over the inner edge 16a of the spring plate 16. Preferably, the bulge 15c is neighboring or adjacent to the planar surface 15e. Preferably, the planar surface 15e merges into the bulge 15c.

The first sealing element 17 and/or the second sealing element 15 can be individually or both made of an elastic material, preferably of rubber or another suitable material, which is fixed (e.g. vulcanised) on the spring plate 16.

FIG. 7 shows a housing part 3a, 3b according to the invention. The housing part has advantageous and preferred adaptations for the elastic element 1a, 1b according to the invention.

The housing part 3a, 3b comprises an annular recess 11 for clamping the annular elastic element 1a, 1b, wherein the recess 11 forms a first annular edge 12a and a second annular edge 12b of an annular opening 12 of the housing part 3a, 3b, wherein the annular recess 11 defines an inner surface 105 of the housing part 3a, 3b between the first annular edge 12a and the second annular edge 12b, wherein the inner surface 105 forms a first slope 103 (or long chamfer) in the region of the first annular edge 12a and the inner surface 105 forms a second slope 104 (or long chamfer) in the region of the second annular edge 12b, wherein the slopes 103, 104 are oriented such that the annular opening 12 increases towards the first and second edges 12a, 12b.

The inner surface 105 can form a first abutment surface 101 and a second abutment surface 102 which are formed to clamp therebetween the spring plate 16 of the elastic element 1a, 1b according to the invention, wherein the first slope 103 is arranged between the first abutment surface 101 and the first annular edge 12a and wherein the second slope 104 is arranged between the second abutment surface 102 and the second annular edge 12a. When the elastic element 1a, 1b is clamped in the recess 11 with the first side surface 16c facing the inner surface 105, the bulges 15c, 15d are brought into preferably sealing contact with the slopes 103, 104.

As shown in FIG. 7, the first abutment surface 101 can form a first slope 103 (or long chamfer) or merge into this and/or the second abutment surface 102 can form a second slope 104 (or long chamfer) or merge into this, wherein the slopes 103, 104 are each preferably oriented such that the annular opening 12 or the recess 11 increases towards the first and second edges 12a, 12b (cf. FIGS. 7 and 5B). By each of these slopes 103, 104, it is largely avoided that a force bending the clamping element 8 is transmitted by the second sealing element 15 to the clamping element 8, but rather the spring plate 16 or the inner edge 16a primarily transmits the force transmission for clamping or braking the object 5 to the clamping element 8 and the clamping surface 7. This is preserved by the second sealing element 15 which makes the process of opening and closing the device more reliable.

The bulges 15c, 15d are provided since these fill the space at the slopes 103, 104 and come into contact with the slopes 103, 104. For the seal of the first pressure space 4 against the gap at the transition of the clamping elements 8 of adjacent housing parts 3a, 3b, the bulges 15c, 15d are advantageous. The bulges at the housing edge with the slope 103, 104 are advantageous for the fact that during operation of the first pressure space 4 hardly any or no medium flows in or out via the housing edge.

The planar surfaces 15e, 15f firstly increase the resistance to the permeability of a pressure medium (in particular gases) when applying the pressure medium to the second pressure space 2. The planar surfaces 15e, 15f reduce or prevent the overflow of a medium between the first pressure space 4 and the second pressure space 2. The planar surfaces 15f and 15e additionally support the displacement of the bulges 15c, 15d against the slopes 103, 104 on the housing and thus the above-described effects of the bulges. This support is particularly pronounced when, as described in connection with FIGS. 6B and 6C, the planar surface 15e or 15f is adjacent to the associated bulge 15c or 15d and/or merges into it. The planar surfaces and the respectively associated bulges thus form a combination of features which interact synergistically, but can be present individually. For consideration of the vacuum operation, each of the sealing elements 17a and 17b is to be regarded as an additional barrier and supports the seal of the first pressure space 4 against the environment.

The housing part 3a, 3b can have a, preferably circular, groove or nut 110 for receiving an O-ring. The groove or nut 110 can preferably completely surround the housing part 3a, 3b along the circumference of the housing part in the region of the first annular edge 12a, or between an outer edge 100b of the housing part and the first abutment surface 101 or the recess 11. As an alternative or in addition, the groove or nut 110 can preferably completely surround the housing part 3a, 3b along the circumference of the housing part in the region of the second annular edge 12a, or between an inner edge 100a of the housing part and the second abutment surface 102 or the recess 11.

In order now to ensure an additional preferred seal for use in a moist environment, the first sealing element is provided. When the elastic element 1a, 1b is clamped in the recess 11 with the first side surface 16c facing the inner surface 105, the first projection 17a of the first sealing element 17 will make preferably sealing contact with a first portion of the inner surface 105 of the housing part 3a, 3b. The first portion can have an indentation or depression 106 of the housing part 3a, 3b. Preferably, the surface shapes of the first projection 17a and the first portion 106 are at least partially complementary in order to produce a particularly effective sealing contact. When the elastic element 1a, 1b is clamped in the recess 11 with the first side surface 16c facing the inner surface 105, the second projection 17b of the first sealing element 17 will make preferably sealing contact with another portion of the inner surface 105 of the housing part 3a, 3b. This other portion can have an indentation or depression 107 of the housing part 3a, 3b. Preferably, the surface shapes of the second projection 17b and the portion 107 are at least partially complementary in order to produce a particularly effective sealing contact. A fluidic connection between the first pressure space 4 and the environment of the housing, in particular in the region of the transition of two adjacent housing parts 3a, 3b, is inhibited or completely prevented by each of the two projections 17a, 17b.

Preferably, the housing part is made of a material which is not susceptible to corrosion.

Figure 8:
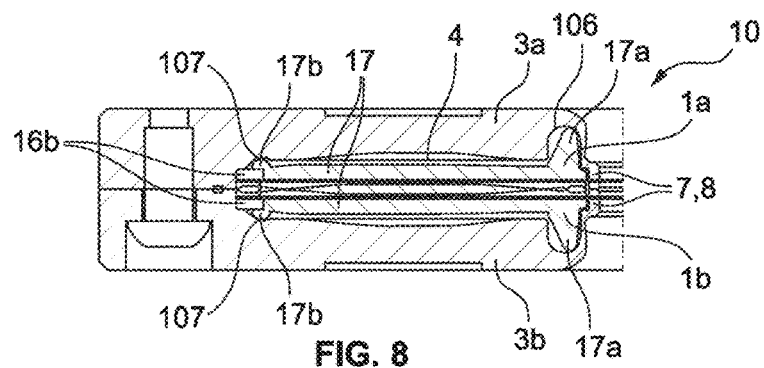
FIG. 8 shows a cross section through a device according to the invention taken perpendicular to the clamping plane.

FIG. 8 shows an inventive clamping and/or braking device 10. In FIG. 8, by way of example, a device 10 with an inwardly directed clamping action is shown as in FIGS. 1A, 2A and 5A.

In FIG. 8, the first projection 17a of the first sealing element 17 of at least one of the elastic elements 1a, 1b produces a preferably sealing contact with a first portion (e.g. 106) of the inner surface 105 of one of the housing parts 3a, 3b in order to thereby at least inhibit a flow connection between a region of the first pressure space 4 and a transition between the housing parts 3a, 3b. The contact can be at least partially sealing against a medium, preferably a fluid or a liquid, which penetrates the housing 3 from outside the device 10 through the gap at the transition of the housing parts 3a, 3b or clamping elements 8.

The region of the first pressure space 4 is arranged in FIG. 8 between the first projection 17a of the first sealing element 17 of the at least one elastic element 1a, 1b and the outer edge 16b of the spring plate 16 of the at least one elastic element 1a, 1b, or the second projection 17b of the first sealing element 17 of the at least one elastic element.

The optional second projection 17b of the first sealing element 17 of at least one of the elastic elements 1a, 1b produces a contact with a second portion (e.g. 107) of the inner surface 105 of the housing part 3a, 3b, wherein the second portion of the inner surface 105 preferably lies between the first abutment surface 101 and the second abutment surface 102 of the housing part 3a, 3b. This projection can also reduce the fluidic connection of the first pressure space 4 to the region outside the clamping element 8. The inner surface 105 can have one or more indentations or depressions 106, 107, wherein the indentation or depression 106, 107 is preferably complementary in shape to the surface of the projection 17a, 17b contacting it.

It can be seen from the combination of FIGS. 6, 7 and 8 that the first abutment surface 101 of each housing part 3a, 3b forms the first slope 103 and the second abutment surface 102 of each housing part 3a, 3b forms the second slope 104, wherein the bulge 15c of the inner projection 15a of the second sealing element 15 of the first elastic element contacts the second slope 104 of the second abutment surface 102 of the housing part 3a, 3b and wherein the bulge 15d of the outer projection 15b of the second sealing element 15 of the first elastic element contacts the first slope 103 of the first abutment surface 101 of the housing part 3a, 3b.

The first elastic element 1a and the second elastic element 1b are clamped in the inner space 13 in FIG. 8 such that the planar surfaces 15e of the inner projections 15a of the second sealing element 15 of the elastic elements 1a, 1b contact each other and/or the planar surfaces 15f of the outer projections 15b of the second sealing elements of the elastic elements 1a, 1b contact each other, so as to delimit the second pressure chamber 2 and seal it in particular during its charging with pressure medium.

Figure 9:
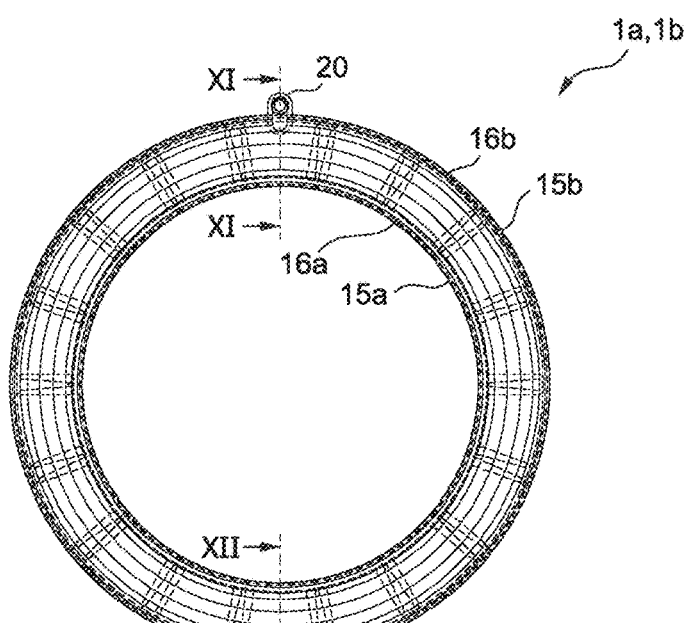
FIG. 9 shows a top view of an elastic element according to the invention.

FIG. 9 shows an embodiment of the elastic element 1a, 1b according to the invention with a first connection seal 30 and/or a second connection seal 20.

The annular spring plate 16 can be arranged between a section of the second connection seal 20 and a section of the first connection seal 30. The first connection seal 30 and the second connection seal 20 can be arranged at opposite sections of the inner edge 16a or outer edge 16b of the annular spring plate 16.

The first connection seal 30 and/or the second connection seal 20 can respectively be made of an elastic material, preferably of rubber.

The first connection seal 30 can be arranged at least in sections radially inwards or outwards offset to the inner edge 16a and/or outer edge 16b (cf. FIG. 9) of the spring plate 16 of the elastic element 1a, 1b. The first connection seal 30 can be part of the first sealing element 17 and/or the second sealing element 15. The first connection seal 30 can protrude in the radial direction over the inner edge 16a or the outer edge 16b (cf. FIG. 9).

The second connection seal 20 can be arranged at least in sections radially inwards or outwards offset to the inner edge 16a and/or outer edge 16b (cf. FIG. 9) of the spring plate 16 of the elastic element 1a, 1b. The second connection seal 20 can be part of the first sealing element 17 and/or the second sealing element 15. The second connection seal 20 can protrude in the radial direction over the inner edge 16a or the outer edge 16b (cf. FIG. 9).

Figure 10:
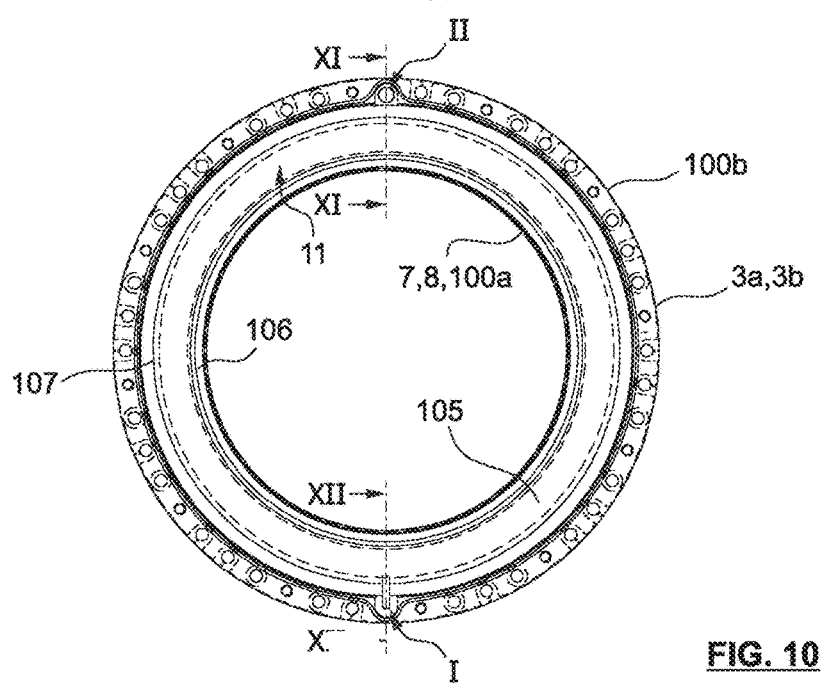
FIG. 10 shows a top view of a variant of a housing part according to the invention or of a housing part of a device according to the invention.
Figure 11:
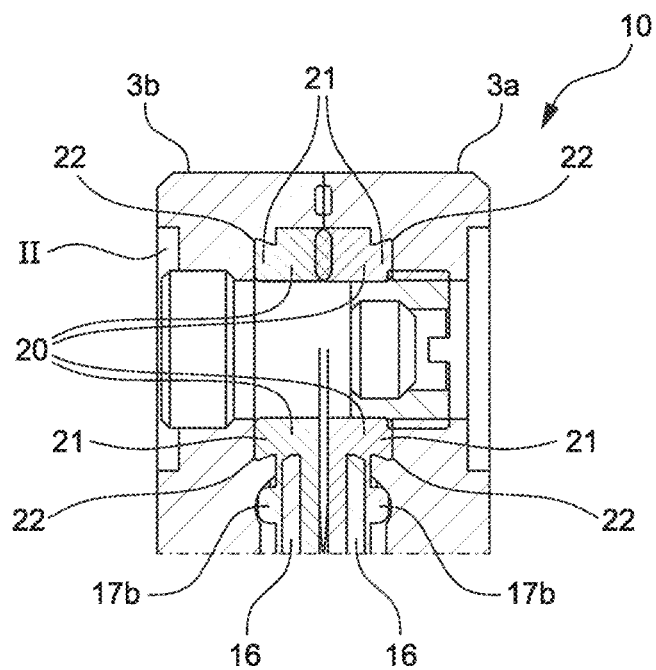
FIG. 11 shows a detail in the region of the second connection seal of a cross section taken perpendicular to the clamping plane of an embodiment of a device according to the invention corresponding to the position of the sections XI through the elastic element and the housing part indicated in FIGS. 9 and 10.
Figure 12:
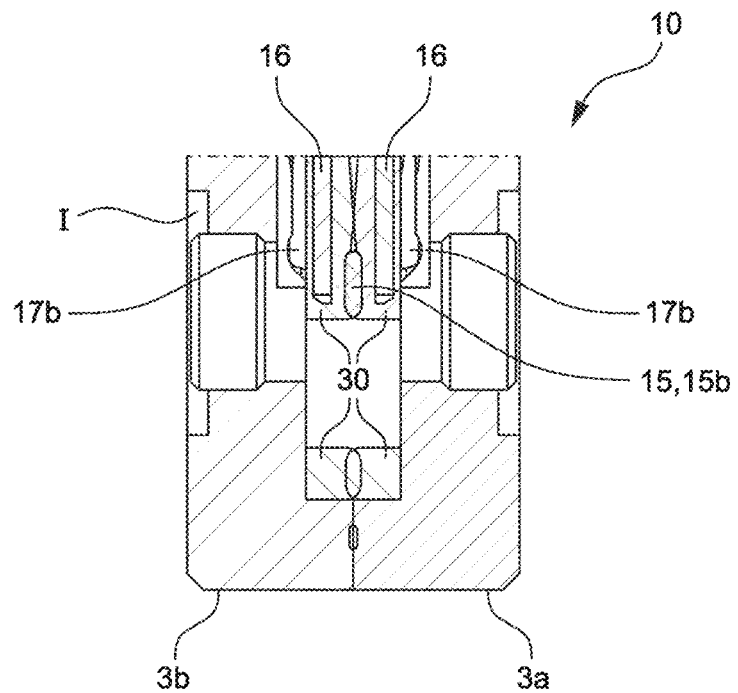
FIG. 12 shows a detail in the region of the first connection seal of a cross section taken perpendicular to the clamping plane of an embodiment of a device according to the invention corresponding to the position of the sections XII through the elastic element and the housing part indicated in FIGS. 9 and 10.

FIGS. 11 and 12 each show a detail of the cross section of the device 10 according to the invention. The left half and the right half of FIGS. 11 and 12 each show a cross section of the elastic element 1a, 1b according to the invention according to FIG. 9 installed in the housing part 3a, 3b according to FIG. 10. Here, the elastic element 1a, 1b is clamped in the recess 11 between the inner edge 100a (or clamping element 8 with clamping surface 7) and the outer edge 100b of the housing part 3a, 3b such that the first connection seal 30 comes into contact with the region of the housing part 3a, 3b for the first port I and the second connection seal 20 comes into contact with the region of the housing part 3a, 3b for the port II. This is carried out twice, so that two components according to the invention are produced, which are then fixed to each other, as shown in FIGS. 11 and 12.

The detail of the cross section of the device 10 shown in FIG. 11 corresponds in its position to the sections XI indicated in FIGS. 9 and 10 through the elastic element 1a, 1b and the housing part 3a, 3b in the region of the second connection seal 20. The second port seal 20 has an edge along a second port opening, wherein the edge serves for sealing the second port II of the clamping and/or braking device 10 for applying a pressure medium to the second pressure chamber 2 of the clamping and/or braking device 10. The second port seal 20 forms a port projection 21 along the edge of the second port opening, which at least partially and preferably completely surrounds the second port opening.

The port projection 21 of the second port seal 20 forms an undercut 22 at least in sections at the edge of the second port opening, in order to increase the sealing in particular with respect to the escape of pressure medium into the environment. The undercut 22 of the second port seal 20 reduces the risk of the second port seal 20 lifting off from the planar housing surface, especially when applying the first pressure space 4. In addition, the use of sealing compound (adhesive) at this point can be avoided by the undercut 22. Such a sealing compound could have a negative effect on the vacuum or clean room.

The second port seal 20 can form a part of the inner or outer projection 15a, 15b of the second sealing element 15. The part of the projection of the second sealing element 15 formed by the second port seal 20 can be arranged on a side of the second port opening 20 facing away from and/or opposite a side of the second port opening 20 at which the port projection 21 is formed by the second port seal 20.

The detail of the cross section of the device 10 shown in FIG. 12 corresponds in its position to the sections XII indicated in FIGS. 9 and 10 through the elastic element 1a, 1b and the housing part 3a, 3b in the region of the first port seal 30. The first port seal 30 has an edge of a first port opening, wherein the edge serves for sealing the first port I of the clamping and/or braking device 10 for applying a pressure medium to the first pressure chamber 4 of the clamping and/or braking device 10. The edge of the first port seal 30 at least partially and preferably completely surrounds the first port opening.

The first port seal 30 can comprise an O-ring which surrounds the first port opening. The bulge 15d of the projection 15b with the slope 103 together with the first port seal 30 at the port I ensure that during application to the first pressure chamber 4 no fluids flow in or out via the housing edge. In addition, undesirable sealing compounds (adhesive) between the housing halves can thereby be dispensed with. Such a sealing compound could have a negative effect on the vacuum or clean room.

By means of the means described here individually and in combination, clamps can be provided which can be reliably operated in the vacuum and/or in the clean room, and optionally in a moist environment, without the dynamics of the opening and closing of the clamp being negatively impaired as a result.

In the description and in the figures, preferred embodiments of the subject matter claimed by the appended claims are described. The optional features disclosed in the above description, the claims and the drawings can be used both individually and in any combination for the implementation of the subject matter claimed here in accordance with the appended claims in their various configurations.

The various aspects and embodiments described above can be combined to provide yet further embodiments. These and other changes can be made to the embodiments in light of the above detailed description. In general, the terms used in the following claims should not be construed to limit the claims to the specific aspects and embodiments disclosed in the description and the claims, but should be construed to include all possible embodiments along with the full scope of equivalents to which these claims are entitled.

The invention claimed is:

1. An annular elastic element for a clamping and/or braking device, the element comprising:
 an annular spring plate, wherein the annular spring plate has a first annular side surface and a second annular side surface;
 a sealing element, wherein the sealing element is arranged on the second side surface of the spring plate, and wherein the sealing element forms an inner projection in a region of an inner edge of the annular spring plate and forms an outer projection in a region of an outer edge of the annular spring plate;
 characterised in that
 the inner and/or outer projection of the sealing element respectively forms a bulge at least in sections.

2. The elastic element according to claim 1, characterised in that the bulge of the inner projection of the sealing element extends radially inwards, and/or that the bulge of the outer projection of the sealing element extends radially outwards.

3. The elastic element according to claim 1, characterised in that the inner and/or outer projection of the sealing element respectively has an at least in sections planar surface.

4. The elastic element according to claim 3, characterised in that the bulge of the inner projection is neighboring or adjacent to the planar surface of the inner projection and/or the bulge of the outer projection is neighboring or adjacent to the planar surface of the outer projection.

5. The elastic element according to claim 1, characterised in that each of the projections of the first and/or second sealing element is annular at least in sections.

6. The elastic element according to claim 1, characterised in that the elastic element further comprises: a first port seal defining an edge of a first port opening of the first port seal, wherein the edge is suitable for sealing a first port of the clamping and/or braking device for applying a pressure medium to a first pressure chamber of the clamping and/or braking device.

7. The elastic element according to claim 1, characterised in that the elastic element further comprises: a second port seal defining an edge of a second port opening of the second port seal, wherein the edge is suitable for sealing a second port of the clamping and/or braking device for applying a pressure medium to a second pressure chamber of the clamping and/or braking device.

8. A housing part for a clamping and/or braking device, the housing part comprising:
 an annular recess for clamping the annular elastic element according to claim 1,
 wherein the recess forms a first annular edge and a second annular edge of an annular opening of the housing part,
 wherein the annular recess defines an inner surface of the housing part between the first annular edge and the second annular edge,
 wherein the inner surface forms a first slope in the region of the first annular edge and the inner surface forms a second slope in the region of the second annular edge, wherein the slopes are oriented such that the annular opening increases towards the first and second edges.

9. The housing part according to claim 8, wherein the inner surface forms a first abutment surface and a second abutment surface which are formed to clamp therebetween the spring plate of the elastic element, wherein the first slope is arranged between the first abutment surface and the first annular edge and wherein the second slope is arranged between the second abutment surface and the second annular edge.

10. A clamping and/or braking device for clamping and/or braking an object to be clamped and/or braked, comprising:
 a first elastic element according to claim 1 and a second elastic element according to claim 1;
 a housing comprising a first housing part with an inner surface and a second housing part with an inner surface, wherein the housing parts are arranged with respect to each other and fixed to each other such that the inner surfaces of the housing parts together delimit an inner space within the housing;
 one or more clamping elements, wherein each clamping element has a clamping surface;
 a spring arranged in the inner space comprising the first elastic element and the second elastic element, wherein the elastic elements are arranged within the inner space such that a first pressure space is formed in the inner space between the elastic elements and the inner surfaces of the housing parts, wherein the first pressure space can be deaerated and can be subjected to positive pressure of a pressure medium suppliable to the housing,
 wherein the first elastic element is clamped in the inner space with its first side surface facing the inner surface of the first housing part, and
 wherein the second elastic element is clamped in the inner space with its first side surface facing the inner surface of the second housing part;
 wherein the spring is designed such that when the first pressure space is aerated or subjected to positive pressure of the first pressure space, a bending of at least one of the spring plates of the elastic elements can be changed and thereby the device changes between an open state, in which an object to be clamped is spaced apart from the one or more clamping surfaces, and a closed state, in which at least one of the one or more clamping surfaces transmits a clamping and/or braking force to the object; and
 wherein the bulge of the inner or outer projection of at least one of the elastic elements is adapted to make contact with a first portion of the inner surface of one of the housing parts in order to thereby at least inhibit a flow connection between the first pressure space and the transition between the housing parts.

11. The clamping and/or braking device according to claim 10, wherein the inner space comprises a second pressure space, wherein the second pressure space is arranged within the spring between the elastic elements.

12. The clamping and/or braking device according to claim 11, wherein the device is designed such that by aerating the second pressure space or by subjecting the second pressure space to positive pressure, one of the clamping elements moves towards a portion of one of the inner surfaces and/or the bending of at least one of the spring plates of the elastic elements increases and thereby the device changes from the closed state to the open state.

* * * * *